(12) United States Patent
Takano

(10) Patent No.: US 10,298,842 B2
(45) Date of Patent: *May 21, 2019

(54) INFORMATION PROCESSING DEVICE, IMAGE SYSTEM, AND METHOD OF TRANSFERRING DATA

(71) Applicant: Satoshi Takano, Kanagawa (JP)

(72) Inventor: Satoshi Takano, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 128 days.

This patent is subject to a terminal disclaimer.

(21) Appl. No.: 15/437,833

(22) Filed: Feb. 21, 2017

(65) Prior Publication Data

US 2017/0264823 A1    Sep. 14, 2017

(30) Foreign Application Priority Data

Mar. 8, 2016 (JP) ................................. 2016-044518

(51) Int. Cl.
*H04N 5/232* (2006.01)
*H04N 1/333* (2006.01)
(Continued)

(52) U.S. Cl.
CPC ..... *H04N 5/23245* (2013.01); *H04N 1/00933* (2013.01); *H04N 1/32577* (2013.01); *H04N 1/32582* (2013.01); *H04N 1/32603* (2013.01); *H04N 1/333* (2013.01); *H04N 5/2254* (2013.01); *H04N 5/2258* (2013.01); *H04N 5/341* (2013.01); *H04N 5/3452* (2013.01); *H04N 5/374* (2013.01)

(58) Field of Classification Search
CPC ............... H04N 5/23245; H04N 5/341; H04N 1/32582; H04N 1/32603; H04N 1/333
See application file for complete search history.

(56) References Cited

U.S. PATENT DOCUMENTS

2005/0140786 A1* 6/2005 Kaplinsky .......... H04N 5/23203
348/207.1
2005/0285945 A1* 12/2005 Usui ...................... H04N 5/232
348/207.99
(Continued)

FOREIGN PATENT DOCUMENTS

| JP | 2007-110470 | 4/2007 |
|---|---|---|
| JP | 2008-236573 | 10/2008 |
| JP | 2017-038198 | 2/2016 |

*Primary Examiner* — Abdelaaziz Tissire
(74) *Attorney, Agent, or Firm* — Harness, Dickey & Pierce, P.L.C.

(57) ABSTRACT

An information processing device includes a first input interface to receive data transferred in a first transfer mode in which a plurality of elements of the data each belonging to a same line of a plurality of lines are transferred in parallel, a second input interface to receive data transferred in a second transfer mode in which a plurality of elements of the data each belonging to a corresponding one of the plurality of lines are transferred in parallel, a mode selection circuit to change a transfer mode of the data from the second input interface from the second transfer mode to the first transfer mode based on a signal indicating selection of the second input interface, and an output interface to output one of the data from the first input interface and the data from the second input interface.

20 Claims, 9 Drawing Sheets

(51) Int. Cl.
  *H04N 5/374*  (2011.01)
  *H04N 5/225*  (2006.01)
  *H04N 5/345*  (2011.01)
  *H04N 1/00*   (2006.01)
  *H04N 1/32*   (2006.01)
  *H04N 5/341*  (2011.01)

(56) References Cited

U.S. PATENT DOCUMENTS

| | | | | |
|---|---|---|---|---|
| 2011/0242356 | A1* | 10/2011 | Aleksic | H04N 5/2258 |
| | | | | 348/222.1 |
| 2012/0044372 | A1* | 2/2012 | Cote | H04N 5/23245 |
| | | | | 348/218.1 |
| 2012/0120256 | A1* | 5/2012 | Hwang | G06T 1/20 |
| | | | | 348/207.1 |
| 2012/0194836 | A1 | 8/2012 | Takano | |
| 2012/0274808 | A1* | 11/2012 | Chong | H04N 5/23293 |
| | | | | 348/234 |
| 2013/0162863 | A1* | 6/2013 | Tanaka | G06T 1/20 |
| | | | | 348/223.1 |
| 2014/0146187 | A1* | 5/2014 | Ju | H04N 5/23241 |
| | | | | 348/207.1 |
| 2016/0239936 | A1* | 8/2016 | Baek | H04N 5/2258 |
| 2017/0046294 | A1* | 2/2017 | Takano | G06F 13/4022 |
| 2017/0118450 | A1* | 4/2017 | Jung | H04N 9/09 |

* cited by examiner

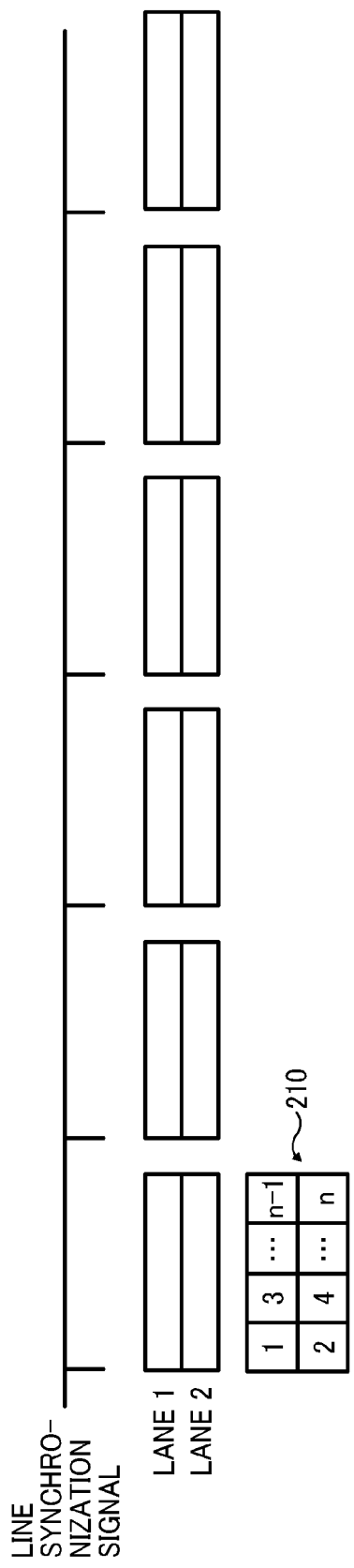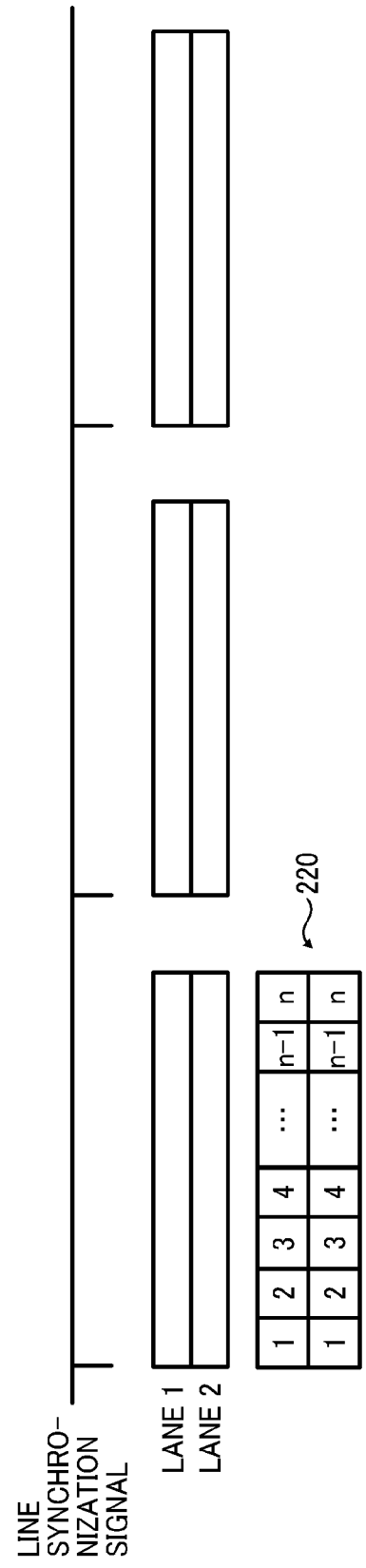

LINE SYNCHRONIZATION SIGNAL
FRAME VALID SIGNAL
LINE VALID SIGNAL
LANE 1
LANE 2

PSEUDO LINE SYNCHRONIZATION SIGNAL
FRAME VALID SIGNAL
LINE VALID SIGNAL
LANE 1
LANE 2

PSEUDO LINE SYNCHRONIZATION SIGNAL
FRAME VALID SIGNAL
LINE VALID SIGNAL
LANE 1
LANE 2

INFORMATION PROCESSING DEVICE, IMAGE SYSTEM, AND METHOD OF TRANSFERRING DATA

CROSS-REFERENCE TO RELATED APPLICATION

This patent application is based on and claims priority pursuant to 35 U.S.C. § 119(a) to Japanese Patent Application No. 2016-044518, filed on Mar. 8, 2016, in the Japan Patent Office, the entire disclosure of which is hereby incorporated by reference herein.

BACKGROUND

Technical Field

Embodiments of the present disclosure relate to an information processing device, an imaging system, and a method of transferring data.

Description of the Related Art

In a conventional electrophotographic imaging system, an imaging device, such as a complementary metal oxide semiconductor (COMS) sensor, typically transfers data in synchronization with a line synchronization signal to an arithmetic processing device, such as a digital signal processor (DSP). The imaging device may perform image processing including encoding the image data using software programs executed by a central processing unit (CPU).

In recent years, a technique for performing the image processing, including encoding the data, with hardware before transferring to the DSP has been devised and employed.

Regarding the technique for performing the image processing, including encoding the data with the hardware, a system in which the imaging device inputs the data to a hardware device that processes images and then transfers the image data to the arithmetic processing device is known. With this technique, which performs image processing in the hardware device before transferring the image data to the arithmetic processing device, the arithmetic processing device can process the image without deterioration of performance.

In the conventional system, which uses the hardware device disposed between the imaging device and the arithmetic processing device to perform the image processing, the data output from the imaging device in units of single lines is also input to the arithmetic processing device in units of single lines. The arithmetic processing device then processes the data in units of lines. Alternatively, there is also known an imaging device that transfers multiple lines at a time. Such an imaging device can perform complicated image processing by processing multiple lines simultaneously.

SUMMARY

An information processing device includes a first input interface to receive data transferred in a first transfer mode in which a plurality of elements of the data each belonging to a same line of a plurality of lines are transferred in parallel, a second input interface to receive data transferred in a second transfer mode in which a plurality of elements of the data each belonging to a corresponding one of the plurality of lines are transferred in parallel, a mode selection circuit to change a transfer mode of the data from the second input interface from the second transfer mode to the first transfer mode based on a signal indicating selection of the second input interface, and an output interface to output one of the data from the first input interface and the data from the second input interface. The data from the second input interface is output after the transfer mode is changed to the first transfer mode.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings;

FIG. 2B is a diagram illustrating a pattern of data alignment of the image data transferred from an image sensor for image capturing;

FIG. 2C is a diagram illustrating a pattern of data alignment of the image data transferred from an image sensor for automatic exposure (AE);

DETAILED DESCRIPTION

Figure 1:
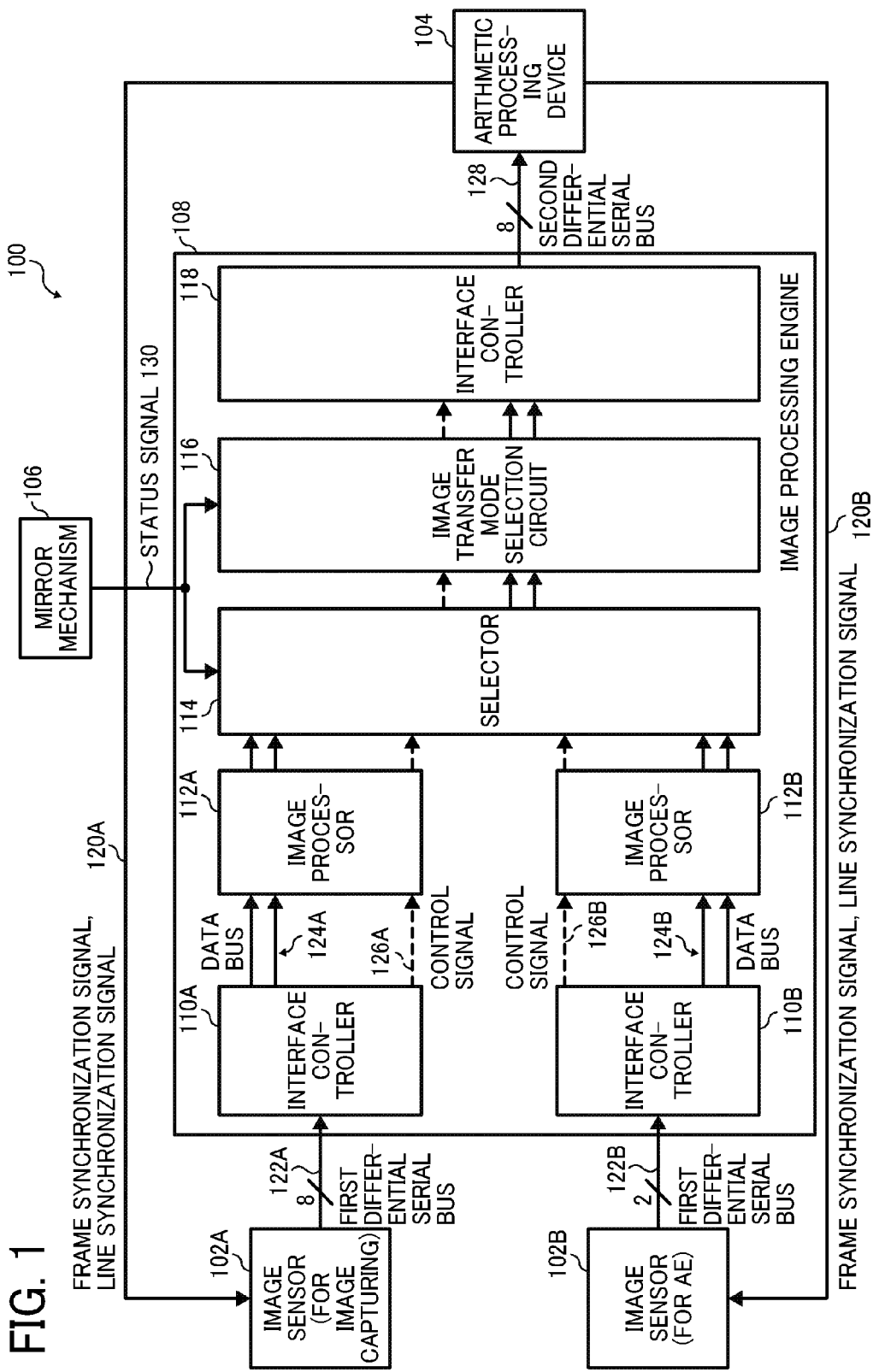
FIG. 1 is a block diagram illustrating an imaging system according to an embodiment.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing preferred embodiments illustrated in the drawings, specific terminology is employed for the sake of clarity. However, the disclosure of this patent specification is not intended to be limited to the specific terminology so selected, and it is to be understood that each specific element includes all technical equivalents that have the same function, operate in a similar manner, and achieve a similar result. In the embodiment described below, an image processing engine 108 and an imaging system 100 including the image processing engine 108 are respectively described as one of examples of an information processing device and an imaging system.

FIG. 1 is a block diagram illustrating the imaging system 100 according to one of embodiments. The imaging system 100 includes the image processing engine 108. The imaging system 100 illustrated in FIG. 1 includes a plurality of image sensors 102, an arithmetic processing device 104, and the image processing engine 108. The image processing engine 108 is connected to the plurality of image sensors 102, the arithmetic processing device 104, and a mirror mechanism 106.

The image sensor 102 transfers image data in units of lines through a first differential serial bus 122 based on synchronization signals 120 including a frame synchronization signal and a line synchronization signal (hereinafter, both of the frame synchronization signal and the line synchronization signal are collectively indicated with a numeral reference of 120) received from the arithmetic processing device 104. In the description of the embodiment, two image sensors 102 are provided. As an example of the embodiment, one of the two image sensors 102 is an image sensor 102A that is used for capturing an image (hereinafter the image sensor 102B may be referred to as an image capturing-image sensor 102A), and the other is an image sensor 102B that is used for automatic exposure (AE) (hereinafter, the image sensor 102B may be referred to as an AE image sensor 102B. As one example of the first differential serial bus 122, low voltage differential signaling (LVDS) may be used. Each of the first differential serial buses 122 may have two or more lanes. Here in the embodiment, each differential serial bus 122 has two lanes. Using the first differential serial bus 122 improves noise resistance in transferring data from the image sensor 102 to the image processing engine 108.

The arithmetic processing device 104 includes a digital signal processor (DSP). The arithmetic processing device 104 outputs the frame synchronization signal and the line synchronization signal 120 to each of the plurality of image sensors 102. The arithmetic processing device 104, which is placed in the latter-stage of the image processing engine 108, processes the image data transferred from the image sensor 102 via the image processing engine 108.

The mirror mechanism 106 is a mechanism that is employed in, for example, a single-lens reflex camera. The mirror mechanism 106 has a plurality of states that indicate which one of the plurality image sensors 102 an image reaches to after passing through a lens. In the embodiment, the mirror mechanism 106 has a first state (open) in which the image passes through the lens and reaches the image sensor 102A, which is used for image capturing, and a second state (close) in which the image passes through the lens and reaches to the image sensor 102B, which is used for AE. The mirror mechanism 106 inputs a status signal 130 to the image processing engine 108 to give information on the state of the mirror mechanism 106 to the image processing engine 108. The status signal 130 reflects one of the first state (open) indicating selection of an image sensor 102A side, which is used for image capturing, and the second state (close) indicating selection of an image sensor 102B side, which is used for AE.

The image processing engine 108 performs a predetermined processing on the image data transferred from the image sensors 102 based on the status signal 130, and then transfers the image data to the arithmetic processing device 104 through a second differential serial bus 128. As one example of the second differential serial bus 128, the LVDS may be used. The differential serial bus 128 has two or more lanes. In the embodiment, the second differential serial bus 128 has two lanes. Using the second differential serial bus 128 improves the noise resistance in transferring the data from the image processing engine 108 to the arithmetic processing device 104.

FIG. 1 also illustrates a detailed configuration of the image processing engine 108. The image processing engine 108 illustrated in FIG. 1 includes a plurality of interface controllers 110 placed in an input side, a plurality of image processors 112, a selector 114, an image transfer mode selection circuit 116, and an interface controller 118 placed in an output side. In the embodiment, two interface controllers 110A and 110B and two image processors 112A and 112B are provided to correspond to the number of image sensors 102.

The interface controllers 110A and 110B individually control an interface, such as a LVDS interface. Each of the interface controllers 110A and 110B generates a line synchronization signal, a frame valid signal, and a line valid signal based on image area information transferred through the corresponding one of the differential serial buses 122A and 122B. The image area information includes synchronization information that defines a frame and lines. The line synchronization signal indicates a start of a line. The frame valid signal indicates a start of a frame. The line valid signal indicates that output pixels of data are valid. Three signals of the line synchronization signal, the frame valid signal, and the line valid signal are configured as timing control signals in the embodiment, and hereinafter may collectively referred to as control signal 126A and 126B.

The interface controllers 110A and 110B receive the image data transferred from the differential serial buses 122A and 122B, respectively, at the same time, and then output the image data, as data to be processed in the image processing engine 108, to the data buses 124A and 124B, respectively. Each of the data buses 124A and 124B has two lanes each of which sends the image data pixel by pixel.

Each of the image sensors 102A and 102B, which are placed in the input side of the image processing engine 108, outputs the image data to the corresponding one of the interface controllers 110A and 110B through the corresponding one of the differential serial buses 122A and 122B, in a predetermined transfer mode. As described above, each of the differential serial buses 122A and 122B has a plurality of lanes. For example, the image capturing-image sensor 102A transfers a plurality of pixels each belonging to the same line in parallel, using the plurality of lanes. Hereinafter, this transfer mode, which is used in the image sensor 102A side, is referred to as a multi-pixel parallel transfer mode. The AE image sensor 102B, for example, transfers the plurality of pixels each belonging to a corresponding one of the plurality of lines in parallel using the plurality of lanes. Hereinafter, this transfer mode, which is used in the AE image sensor 102B side, is referred to as a multi-line parallel transfer.

In the embodiment, each of the first differential serial buses 122A and 122B has two lanes. In the embodiment, the image capturing-image sensor 102A, accordingly, transfers two pixels both belonging to the same line in parallel, and namely uses a two-pixel parallel transfer mode. In addition, the AE image sensor 102B, accordingly, uses a two-line parallel transfer mode in which two pixels each belonging to a corresponding one of two different lines are transferred in parallel. The present disclosure, however, is not limited to the embodiment described above, and as another embodiment, the image sensor 102 may use a transfer mode in which three or more arbitrary pixels or three or more pixels in an arbitrary line are transferred in parallel according to the number of lanes of the first differential serial bus 122.

Figure 2A:
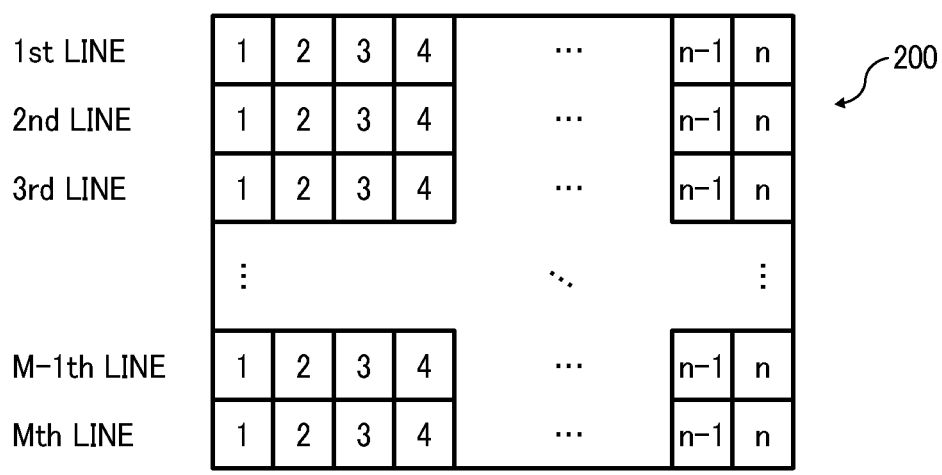
FIG. 2A is a diagram illustrating a data structure of image data generated with an image sensor.

FIG. 2A is a diagram illustrating a data structure of the image data generated with the image sensor 102 according to the embodiment. As described in FIG. 2A, the image sensor 102 has a plurality of imaging elements, such as photodetectors, arranged in an X-Y matrix, with each imaging element usually corresponding to one pixel of the image data. The image sensor 102 resets a counter at a transfer position in the first line in response to the frame synchronization signal, and transfers pixels sequentially from the first pixel in each line every time the line synchronization signal is input. With the multi-pixel parallel transfer mode, the plurality of pixels that belongs to the same line and has the same number with the number of lanes are transferred in parallel, when there are the plurality of lanes. With the multi-line parallel transfer mode, the number of lines corresponding to the number of lanes are transferred in parallel.

FIG. 2B is a diagram illustrating a pattern of data alignment of the image data transferred from the image capturing-image sensor 102A. FIG. 2C is a diagram illustrating a pattern of data alignment of the image data transferred from the AE image sensor 102B. In FIGS. 2B and 2C, the number of lanes is two.

As described above, the image capturing-image sensor 102A transfers the image data in the two-pixel parallel transfer mode. In the two-pixel parallel transfer mode, the pixels of data sequentially positioned in the same line are transferred sequentially using the two lanes, lane 1 and lane 2, in synchronization with the line synchronization signal from the arithmetic processing device 104, after the frame synchronization signal is input from the arithmetic processing device 104. That is, arrangement of transfer data is illustrated as an data array 210 of FIG. 2B, in which a set of odd-numbered pixels in the same line is transferred using one of the two lanes (lane 1) and a set of even-numbered pixels in the same line is transferred using the other of the two lanes (lane 2).

The AE image sensor 102B transfers the image data in the two-line parallel transfer mode. In the two-line parallel transfer mode, each line of data is transferred using one of two lanes pixel by pixel, so that two lines of data is transferred at a time using lane 1 and lane 2 in a pixel basis in synchronization with the line valid signal from the arithmetic processing device 104, after the frame synchronization signal is input from the arithmetic processing device 104. That is, the arrangement of transfer data is illustrated as a data array 220 of FIG. 2B, in which the pixels in the same line are transferred using one of the two lanes.

Here in the description with reference to FIGS. 2B and 2C, two pixels are illustrated as simultaneously sent with two lanes, however, two pixels may not sent strictly at the same time, but may sent almost at the same time.

The image capturing-image sensor 102A transfers the image data in the multi-pixel parallel transfer mode as described above. The interface controller 110A in the embodiment, accordingly, serves as a first input function that receives transfer data in which a plurality of elements in the same line are transferred in parallel. The AE image sensor 102B transfers the image data in the multi-line parallel transfer mode as described above. The interface controller 110B in the embodiment, accordingly, serves as a second input function that receives the transfer data in which elements each belonging to different one of the plurality of lines are transferred in parallel.

Additionally, the arithmetic processing device 104 placed in the output side of the image processing engine 108 typically receives the image data transferred in the multi-pixel parallel transfer mode. The image processing engine 108, accordingly, changes a transfer mode of the image data output in the multi-line parallel transfer mode from the AE image sensor 102B to the multi-pixel parallel transfer mode, which is used with the image capturing-image sensor 102A, and then transfers the image data to the arithmetic processing device 104.

Returning to FIG. 1, the detailed configuration of the image processing engine 108 is described more below. The interface controllers 110A and 110B generate the image data and the control signals and transfer to the image processors 112A and 112B, respectively. The image processors 112A and 112B perform image processing, including encoding, on the received image data. The image processors 112A and 112B each can detect an image area based on the control signal generated based on the image area information at the interface controllers 110A and 110B. By detecting the image area, the image processors 112A and 112B can process the image data efficiently. Additionally, the image processor 112B receives the image data transferred in the multi-line transfer mode from the AE image sensor 102B and processes the plurality of lines of data at a time, and thus achieves more complicated image processing than simple image processing that is performed in line by line.

The selector 114 selects the image data and the control signal from one of the image capturing-image sensor 102A and the AE image sensor 102B, and then outputs the selected image data and control signal to the image transfer mode selection circuit 116, which is placed in the latter-stage. In the description of the embodiment, the selector 114 selects a data path based on the status signal 130 from the mirror mechanism 106. The selector 114 selects the data path that is from the interface controller 110A of the image capturing-image sensor 102A side to the interface controller 118, when the status signal 130 indicates the selection of the image capturing-image sensor 102A side. At the same time, the selector 114 selects the data path that is from the interface controller 110B of the AE image sensor 102B side to the interface controller 118, when the status signal 130 indicates the selection of the AE image sensor 102B side. The selector 114 serves as a selecting function in the embodiment.

The image transfer mode selection circuit 116 selects one of the multi-pixel parallel transfer mode from the image capturing-image sensor 102A and the multi-line parallel transfer mode from the AE image sensor 102B based on the status signal 130 from the mirror mechanism 106.

In the description of the embodiment, the image transfer mode selection circuit 116 changes transfer mode of the image data and the control signal from the multi-line parallel transfer mode into the multi-pixel parallel transfer mode, when the status signal 130 indicates the selection of the AE image sensor 102B side (the status signal 130 indicates the second status (close)). The image transfer mode selection circuit 116 then outputs the image data and the control signal to the interface controller 118 placed in the latter-stage. The image transfer mode selection circuit 116 serves as a mode changing function in the embodiment.

As described above, the image data and the control signal are transferred from the interface controllers 110A and 110B to the interface controller 118. The interface controller 118 generates image area information based on the control signal input from the pre-stage. The interface controller 118 then outputs, to the arithmetic processing device 104, which is placed in the latter-stage, the image data from the image capturing-image sensor 102A or the image data of which the transfer mode is changed with the image transfer mode selection circuit 116, in the multi-pixel parallel transfer mode through the second differential serial bus 128. The interface controller 118 serves as an outputting function in the embodiment.

Figure 3:
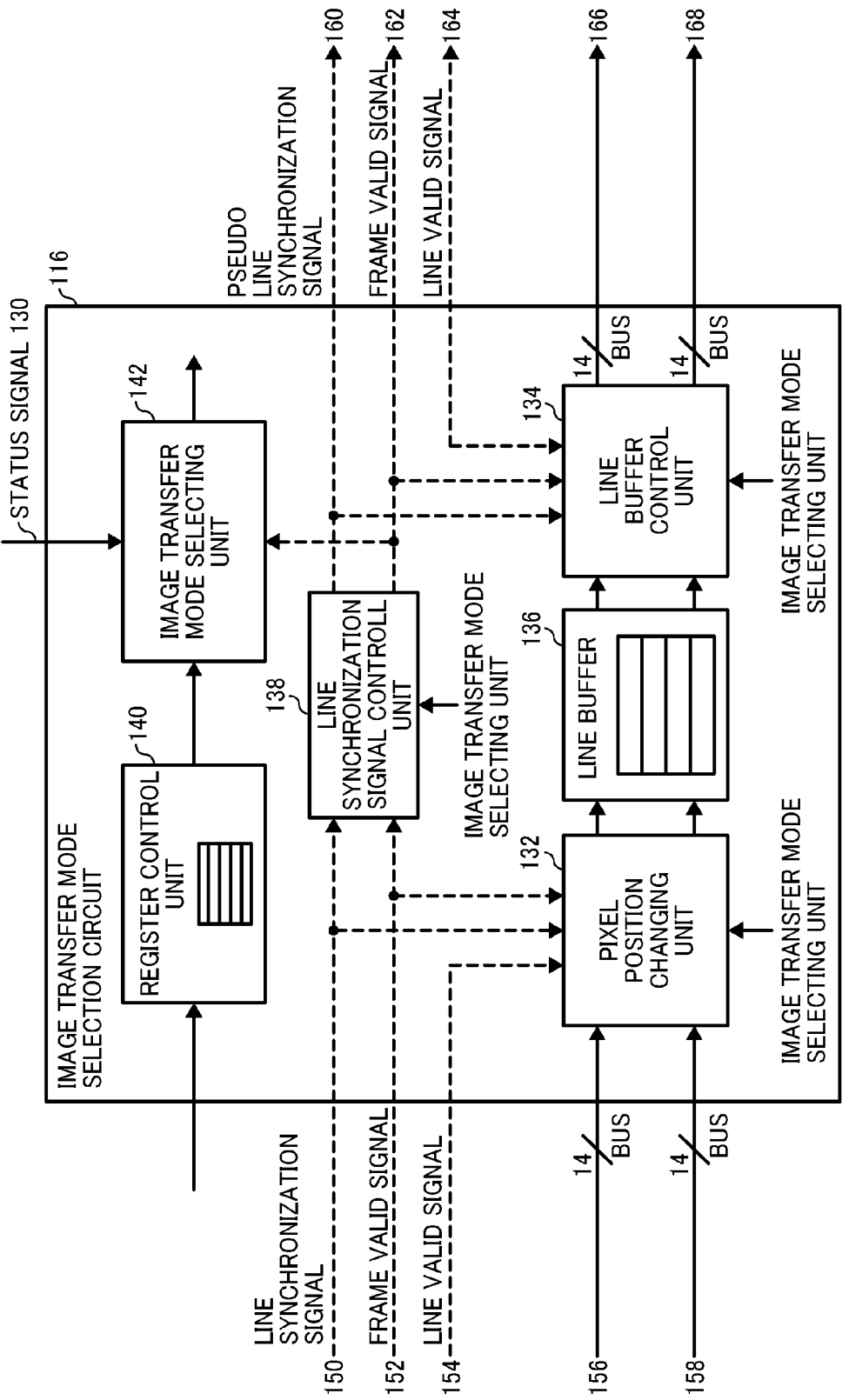
FIG. 3 is a block diagram illustrating a hardware configuration of an image transfer mode selection circuit in the imaging system illustrated in FIG. 1.

A detailed configuration of the image transfer mode selection circuit 116 will be described with reference to FIGS. 3 and 4. FIG. 3 is a block diagram illustrating a hardware configuration of the image transfer mode selection circuit 116 of the imaging system 100 according to the embodiment. The image transfer mode selection circuit 116 illustrated in FIG. 3 includes a pixel position changing unit 132, a line buffer control unit 134, a line buffer 136, a line synchronization signal control unit 138, a register control unit 140, and an image transfer mode selecting unit 142.

The image transfer mode selection circuit 116 receives the control signals including a line synchronization signal 150, a frame valid signal 152, and a line valid signal 154 as an input from the selector 114 in the pre-stage. The image transfer mode selection circuit 116 also receives the transferred image data from the selector 114 of the pre-stage through data buses 156 and 158. The data buses 156 and 158 each have a bus width corresponding to the number of bits per pixel. In the description of the embodiment, the image data and the control signal input from the selector 114 in the pre-stage are from one of the image sensors 102 selected with the selector 114.

The register control unit 140 holds control register setting values for various setting. The control register setting values include a setting value for changing the transfer mode. The number of pixels per line to be transferred is hold in the register control unit 140. The setting value for changing the transfer mode indicates whether the transfer mode is changed based on the status signal 130, or the transfer mode is fixed regardless of the status signal 130. The register control unit 140 outputs a select signal to the image transfer mode selecting unit 142 based on the setting value for changing the transfer mode. Information indicating the number of pixels per line to be transferred is informed to the line buffer control unit 134 via the image transfer mode selecting unit 142. Register setting of the register control unit 140 is performed with, for example, a central processing unit (CPU) or the arithmetic processing device 104. The register control unit 140 serves as a setting function in the embodiment.

The image transfer mode selecting unit 142 generates a selection control signal to select an image transfer mode based on the select signal from the register control unit 140 and the status signal 130 from the mirror mechanism 106, and then outputs the selection control signal to the pixel position changing unit 132, the line buffer control unit 134, and the line synchronization signal control unit 138.

The image transfer mode selecting unit 142 uses the select signal from the register control unit 140 to determine whether to automatically control the transfer mode based on the status signal 130 or to select the transfer mode based on the control setting value.

For example, when the select signal has two bits, "00" may indicate stop of data transfer, "01" may indicate automatic control, "10" may indicate the two-pixel parallel transfer mode, and "11" may indicate the two-line parallel transfer mode. With this definitions of the select signal having two bits, when the select signal indicates the automatic control ("01"), the image transfer mode selecting unit 142 generates the selection control signal that indicates and sets whether to change the transfer mode based on the status signal 130 that is further input to the image transfer mode selecting unit 142. When the select signal indicates the two-pixel parallel transfer mode ("10"), the image transfer mode selecting unit 142 generates the selection control signal that indicates and sets not to change the transfer mode regardless of the status signal 130 input. When the select signal indicates the two-line parallel transfer mode ("11"), the image transfer mode selecting unit 142 generates the selection control signal that indicates and sets to change the transfer mode regardless of the status signal 130 input. When the select signal indicates the stop of the data transfer ("00"), the control signal that indicates to stop of the data transfer is generated. As described above, an automatic control function for the transfer mode can be activated or inactivated and thus the system having high versatility can be achieved.

The pixel position changing unit 132, the line buffer control unit 134, and the line synchronization signal control unit 138 use the selection control signal from the image transfer mode selecting unit 142 to stop or start the data transfer.

Based on the selection control signal from the image transfer mode selecting unit 142, the pixel position changing unit 132 stores the image data, which is transferred from the selector 114, to the line buffer 136 according to the line synchronization signal 150, the frame valid signal 152, and the line valid signal 154.

As long as the status signal 130 indicating the selection of the image capturing-image sensor 102A side (open) is input under the automatic control, the selection control signal that indicates not to change the transfer mode is input to the pixel position changing unit 132. When the transfer mode is not to be changed, the transfer mode is the two-pixel parallel transfer mode, and the pixel position changing unit 132 requests the line buffer 136 to write the data to in units of two pixels. In contrast, as long as the status signal 130 indicating the selection of the AE image sensor 102B side (close) is input under the automatic control, the selection control signal that indicates to change the transfer mode is input to the pixel position changing unit 132 is input. When the transfer mode is to be changed, the present transfer mode is the multi-line parallel transfer mode, and the pixel position changing unit 132 requests each line buffer to write the data pixel by pixel. The pixel position changing unit 132 serves as a storing function in the embodiment.

The line buffer 136 stores the plurality of lines of data. The line buffer 136 can process a write request from the pixel position changing unit 132 and a read request from the line buffer control unit 134 concurrently. The line buffer 136 saves the image data in a manner that the pixels in the same line are arranged sequentially. The system using the two-line parallel transfer mode defines two lines as a set, and writes and reads by toggle-switching between two sets.

The line synchronization signal control unit 138 generates a pseudo line synchronization signal 160 and a frame valid signal 162 output to the latter-stage based on the line synchronization signal 150 and the frame valid signal 152 transferred from the pre-stage and the selection control signal input from the image transfer mode selecting unit 142.

As long as the status signal 130 indicating the selection of the AE image sensor 102B side (close) is input, in particular, under the automatic control, the selection control signal that indicates to change the transfer mode is input to the line synchronization signal control unit 138. When the transfer mode is to be changed, the line synchronization signal control unit 138 measures a cycle of the line synchronization signal from the AE image sensor 102B side, and generates a pseudo line synchronization signal 160 having a pseudo line cycle and a frame valid signal 162 synchronized with the pseudo line synchronization signal 160 based on the measured cycles. The pseudo line cycle may have a cycle corresponding to one of the number of lanes in the measured cycle. In the description of the embodiment, the number of lanes is two, so that the pseudo line synchronization signal 160 having a half cycle of the measured cycle is generated.

Generating the pseudo line synchronization signal 411 allows an output mode to be switched to a pixel-parallel transfer mode when an input mode is a line-parallel transfer mode.

When the transfer mode is not to be changed, the line synchronization signal control unit 138 generates the pseudo line synchronization signal 160 and the frame valid signal 162 at a timing of the line synchronization signal from the image capturing-image sensor 102A side in the cycle as it is. The line synchronization signal control unit 138 serves as a signal generating function in the embodiment.

The line buffer control unit 134 reads the plurality of pixels in the same line from the line buffer 136 based on the pseudo line synchronization signal 160 and the frame valid signal 162 from the line synchronization signal control unit 138. The line buffer control unit 134 then transfers the image data with the line valid signal 164 synchronized with the pseudo line synchronization signal 160 to the latter-stage through data buses 166 and 168. The line buffer control unit 134 reads out the plurality of pixels in the same line stored in the line buffer 136 no matter what indication, to change the transfer mode or not to change the transfer mode, the selection control signal indicates, and transfers the image data read from the pre-stage to the latter-stage in the two-pixel parallel transfer mode.

The line buffer control unit 134 serves as a transferring function in the embodiment.

The image transfer mode selection circuit 116 outputs the pseudo line synchronization signal 160, the frame valid signal 162, and the line valid signal 164 that are controlled with the selection control signal from the image transfer mode selecting unit 142 to the interface controller 118 placed in the latter-stage. The image transfer mode selection circuit 116 further transfers the image data to the interface controller 118 in the latter-stage through the data buses 166 and 168. The data buses 166 and 168 individually output the plurality of pixels concurrently in synchronization with the pseudo line synchronization signal. The data buses 166 and 168 individually have a bus width corresponding to the number of bits per pixel. The pseudo line synchronization signal 160 serves as a trigger for transferring the data to the second differential serial bus 128. Each of the frame valid signal 162 and the line valid signal 164 can define an amount of transfer data and thus the efficient data transfer can be achieved.

In a preferable example of the embodiment, the image transfer mode selection circuit 116 can control the transfer of the image data to the latter-stage based on one or both of states of the frame valid signals, one from the image capturing-image sensor 102A side and the other from the AE image sensor 102B side, when detecting the state of the status signal 130 is switched.

In the preferable example of the embodiment, the image transfer mode selecting unit 142, more specifically, can determine the selection control signal, which is sent to each of the pixel position changing unit 132, the line buffer control unit 134, and the line synchronization signal control unit 138, based on the state of the frame valid signal 162. For example, when the state of the status signal 130 is switched in a middle of transferring frame data, the image transfer mode selecting unit 142 can delay the switching of the control select signal until the frame valid signal 162 is negated. The negation of the frame valid signal 162 indicates that the frame data transfer is completed, so that the frame data is maintained even when the state of the status signal 130 is switched in the middle of the frame data transfer. That is, occurrence of an abnormal image data is prevented from by switching a data path after the completion of the frame data transfer.

The line synchronization signal control unit 138 further can stop the transfer until detecting the frame valid signal 162 is asserted next time when a switched destination of the transfer is in a middle of the frame data transfer. This is because that the AE image sensor 102B may continuously input the frame data for transferring a frame as the frame data, though the image capturing-image sensor 102A transfers a frame as the frame data at a time. One or both of the image transfer mode selecting unit 142 and the line synchronization signal control unit 138 serves as a mode change controlling function in the preferable example of the embodiment.

Figure 4A:
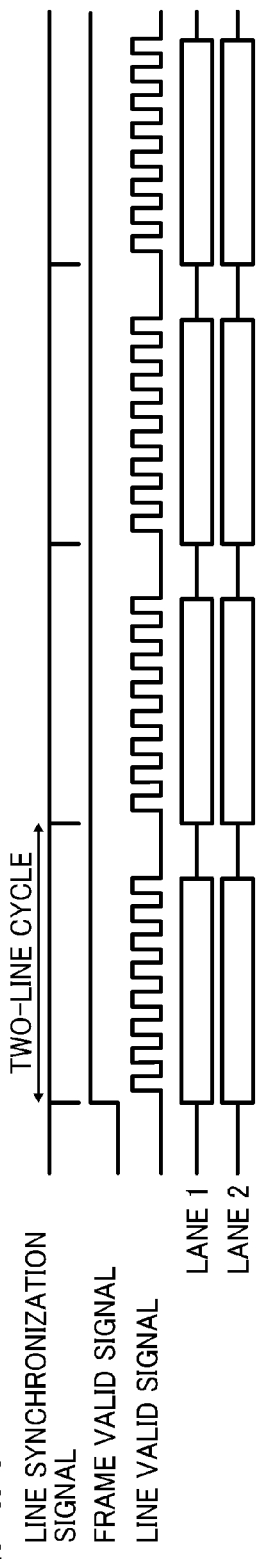
FIGS. 4A, 4B, and 4C are timing charts illustrating states of the data being input to and output from the image transfer mode selection circuit.
Figure 4B:
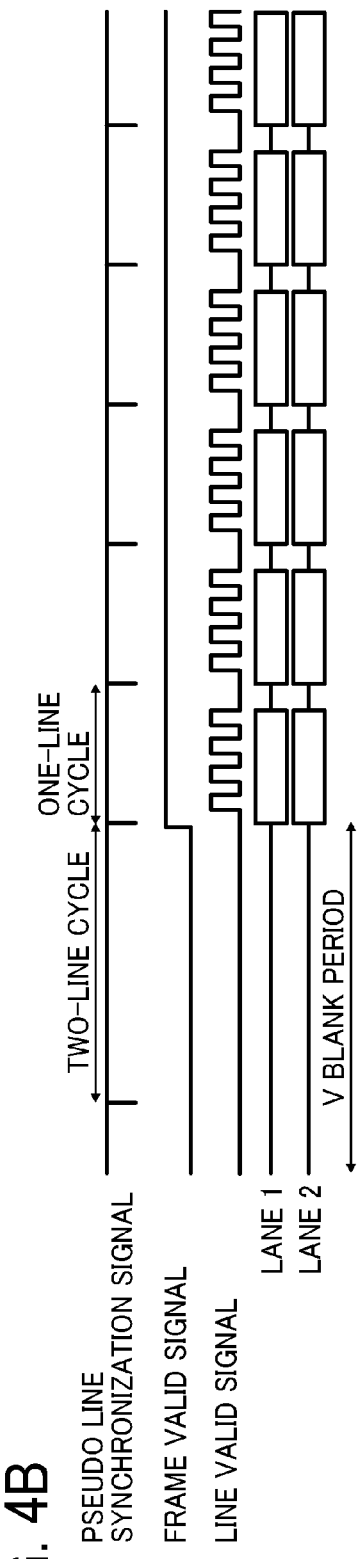
Figure 4C:
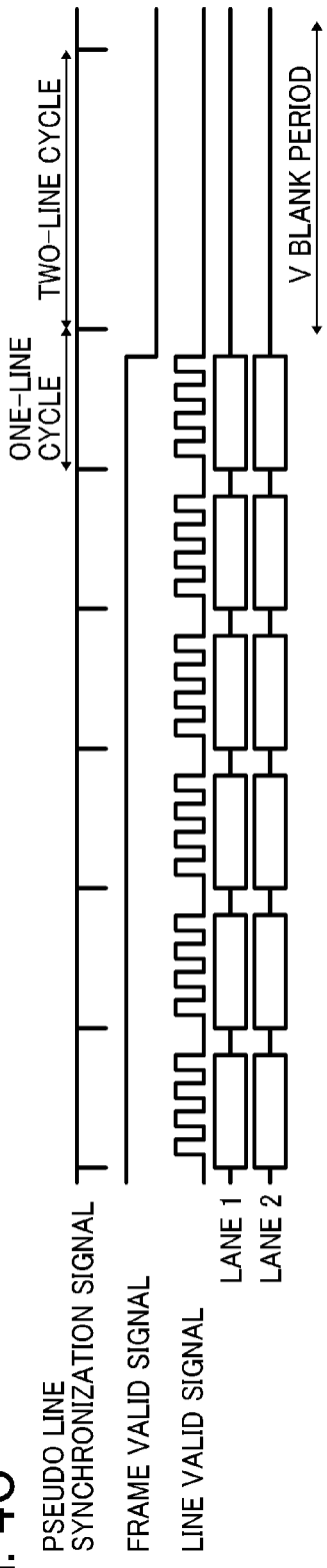

FIGS. 4A to 4C are timing charts each illustrating input and output of the image transfer mode selection circuit 116 in the imaging system 100. Operation in transferring the image data in the two-line parallel transfer mode from the AE image sensor 102B is described with reference to FIGS. 4A to 4C. FIG. 4A is the timing chart illustrating the input and output of the image transfer mode selection circuit 116 in an input side. FIGS. 4B and 4C are the timing charts illustrating the input and output of the image transfer mode selection circuit 116 in an output side. FIG. 4B illustrates operation in association with a start of an image area. FIG. 4C illustrates operation in association with an end of the image area. A V blank period in FIGS. 4B and 4C is a period for a blank area, which is not the image area.

Under the automatic control, when the status signal 130 is switched to indicate the selection of the AE image sensor 102B side (close), the image data and the control signal received at the interface controller 110B are input to the image transfer mode selection circuit 116 in the two-line parallel transfer mode.

When the status signal 130 indicating the selection of the AE image sensor 102B side (close) is input, the image transfer mode selecting unit 142 outputs the selection control signal that indicates to change the transfer mode to the line synchronization signal control unit 138, pixel position changing unit 132, and the line buffer control unit 134.

The operation of the line synchronization signal control unit 138 is described with reference to FIGS. 4A to 4C. When the transfer mode is to be changed, the line synchronization signal control unit 138 starts measuring an assert cycle of the line synchronization signal 150 at a time when the frame valid signal 152 is asserted.

At the start of the image area, when the frame valid signal 152 is negated, the pseudo line synchronization signal 160 is asserted with an assertion timing of the line synchronization signal 150, as described in FIG. 4B. On the other hand, when the frame valid signal 152 is asserted, the pseudo line synchronization signal 160 is asserted with a timing of the pseudo line synchronization cycle that has a half cycle of the measured cycle. Every time the line synchronization signal 150 is asserted, a pseudo line cycle issuing counter is reset, and the pseudo line cycle can synchronize for each two lines.

At the end of the image area, when the frame valid signal 152 is negated, the pseudo line synchronization signal 160 stops asserting with the timing of the pseudo line synchronization cycle, and is asserted only with an assertion timing of the line synchronization signal 150, as described in FIG. 4C. As described above, stopping generating the pseudo line synchronization signal with the pseudo line cycle after the end of the image area and returning the assertion cycle of the pseudo line synchronization signal 160 can prevents the interface controller 118 placed in the latter-stage from issuing unnecessary unnecessary line synchronization packets. This further can reduce power consumption.

Next, the operations of the pixel position changing unit 132 and the line buffer control unit 134 are explained with reference to FIGS. 4A to 4C. The pixel position changing unit 132 requests the line buffer 136 to write for each of data buses 166 and 168, when being input the selection control signal indicating that the transfer mode is to be changed. The line buffer control unit 134 requests the line buffer 136 to read two pixels at a time for each line, and transfers the image data to the data buses 166 and 168 in the two-pixel parallel transfer mode. As described above, the register control unit 140 holds the control register setting value for setting the number of pixels for each line, and the control register setting value is sent to the line buffer control unit 134 via the image transfer mode selecting unit 142. The line buffer control unit 134 performs read request for the number of pixels based on the information of the control register setting value, and stops reading until the pseudo line synchronization signal is asserted next time.

As described above, the transfer mode of the image data from the AE image sensor 102B side can be changed in a manner that the plurality of elements are transferred in parallel, and then the image data of which the transfer mode is changed can be output from the interface controller 118.

Operation in transferring the image data from the image capturing-image sensor 102A in the two-pixel parallel transfer mode is described below.

Under the automatic control, when the status signal 130 indicating the selection of the image capturing-image sensor 102A side (open) is input, the image data and the control signal input to the interface controller 110A in the two-pixel parallel transfer mode are input to the image transfer mode selection circuit 116.

When the status signal 130 indicating the selection of the image capturing-image sensor 102A side (open), the image transfer mode selecting unit 142 outputs the selection control signal indicating that the transfer mode is not to be changed to the line synchronization signal control unit 138, the pixel position changing unit 132, and the line buffer control unit 134. When the transfer data is not to be changed, the line synchronization signal control unit 138 does not measure the assert cycle of the line synchronization signal 150 nor assert the line synchronization signal with the timing of the pseudo line cycle, but asserts the pseudo line synchronization signal 160 with the assertion timing of the line synchronization signal 150.

The pixel position changing unit 132 requests the line buffer to write two pixels at a time in the two-pixel parallel transfer mode. At this time, the line buffer 136 usually serving as a line buffer corresponding to four lines, serves as a line buffer corresponding to two lines. The write request is performed as a write toggle operation in line by line.

The line buffer control unit 134 execute a read request that reads two pixels at a time for each line, even when the transfer mode is not to be changed. The line buffer having the four lines is serving as the line buffer for the two lines, so that the read request is performed in a manner that the two lines are toggle-switched to be read.

Figure 5:
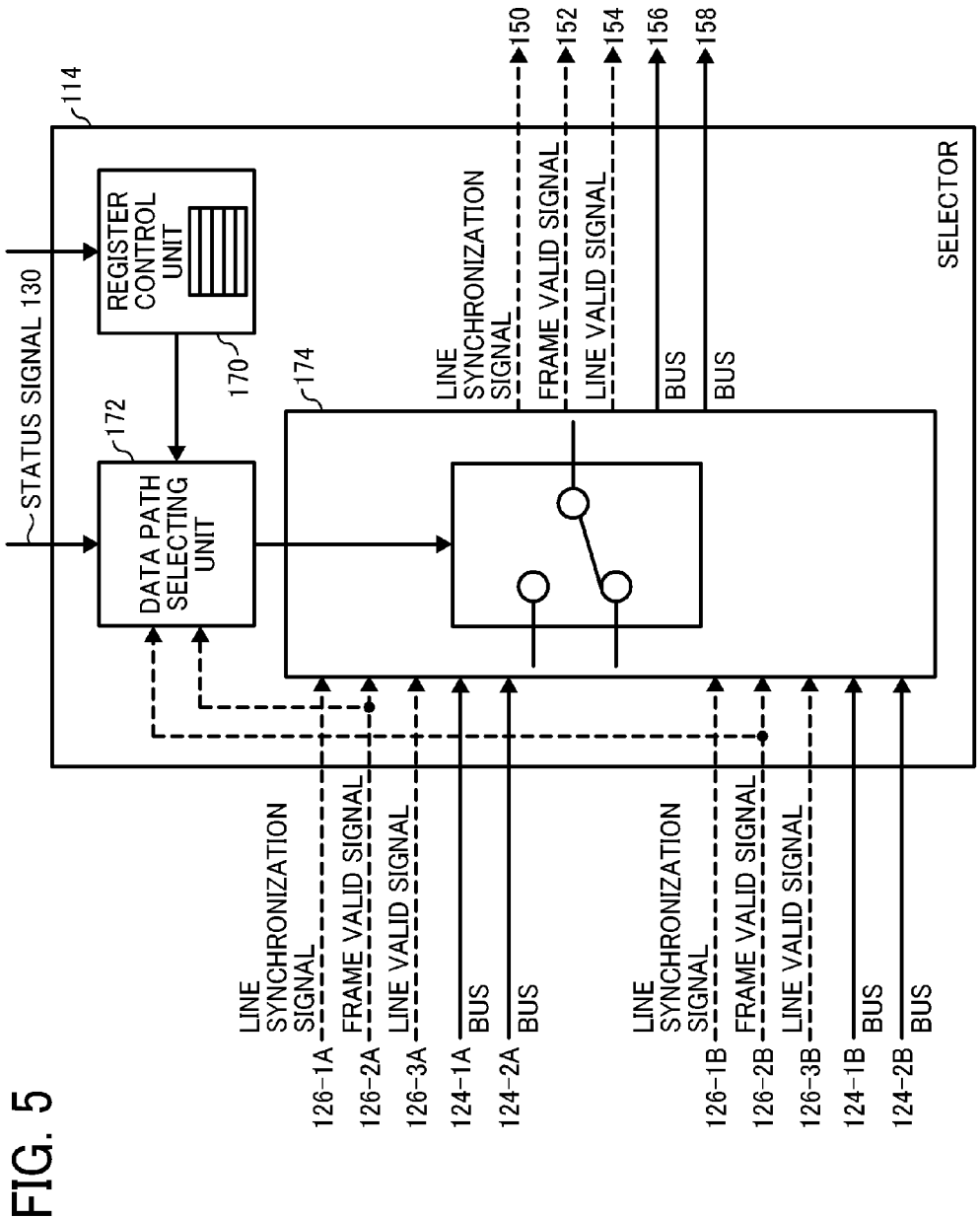
FIG. 5 is a block diagram illustrating a hardware configuration of a selector in the imaging system according to the embodiment.

A detailed configuration of the selector 114 will be described with reference to FIG. 5. FIG. 5 is a block diagram illustrating the detailed configuration of the selector 114 in the imaging system 100 according to the embodiment. The selector 114 illustrated in FIG. 5 includes a register control unit 170, a data path selecting unit 172, and selector unit 174.

The register control unit 170 holds control register setting values for various setting. As a control register setting value, a value associated with a selection for the data path may be hold. A setting value associated with the selection for the data path indicates whether the data path is switched according to the status signal 130 or fixed regardless of the status signal 130. The register control unit 170 outputs a select signal to the data path selecting unit 172 based on the setting value associated with the selection for the data path. Register setting of the register control unit 170 is performed with, for example, the central processing unit (CPU) or the arithmetic processing device 104.

The data path selecting unit 172 generates and outputs a selection control signal to select a data path based on the select signal from the register control unit 170 and the status signal 130 from the mirror mechanism 106.

The data path selecting unit 172 determines whether to select the data path automatically according to the status signal 130 or not automatically but based on the register setting value.

Similar to the image transfer mode selection circuit 116, for example, when the select signal has two bits, "00" may indicate the stop of data transfer, "01" may indicate the automatic control, "10" may indicate the two-pixel parallel transfer mode (path for image capturing), and "11" may indicate the two-line parallel transfer mode (path for AE). With this definitions of the select signal having two bits, when the select signal indicates the automatic control ("01"), the data path selecting unit 172 generates the selection control signal that indicates the selection of one of the path for image capturing and the path for AE, based on status signal 130 that is further input to the data path selecting unit 172. When the select signal indicates the path for image capturing ("10"), the data path selecting unit 172 generates the selection control signal that indicates the path for image capturing regardless of the status signal 130. When the select signal indicates the path for AE ("11"), the data path selecting unit 172 generates the selection control signal indicating the path for AE regardless of the status signal 130. When the select signal indicates the stop of the data transfer ("00"), the control signal that indicates to stop of the data transfer is generated.

The selector unit 174 controls to stop or start the data transfer by switching the data path based on the control signal from the data path selecting unit 172. The selector unit 174 selects the data path that is from the interface controller 110A to the interface controller 118 based on the signal indicating the data path for image capturing. The selector unit 174 selects the data path that is from the interface controller 110B to the interface controller 118 based on the signal indicating the data path for AE.

In a preferable embodiment, the selector 114 controls transfer of the image data of the selected image path based on both or one of the frame valid signals 126-2A and 126-B respectively from the image capturing-image sensor 102A side and the image sensor for AE 202B side when detecting switching of the status signal 130.

In the preferable example of the embodiment, the data path selecting unit 172, more specifically, can determine the selection control signal, which is sent to the selector unit 174, based on one or both of the states of the frame valid signal which is presently selected (126-2A or 126-2B) and the state of the frame valid signal of a switched destination (126-2B or 126-2A). For example, when the state of the status signal 130 is switched in a middle of transferring frame data, the data path selecting unit 172 can delay the switching of the selection control signal until the frame valid signal 162-2 for the side presently selected is negated. The negation of the frame valid signal 126-2 indicates that the frame data transfer is completed, so that the frame data is maintained even when the state of the status signal 130 is switched in the middle of the frame data transfer.

The data path selecting unit 172 further can stop the transfer until detecting the frame valid signal 126-2 is asserted next time when a switched destination of the transfer is in a middle of the frame data transfer. The data path selecting unit 172 serves as a selection controlling function in the preferable example of the embodiment.

Figure 6A:
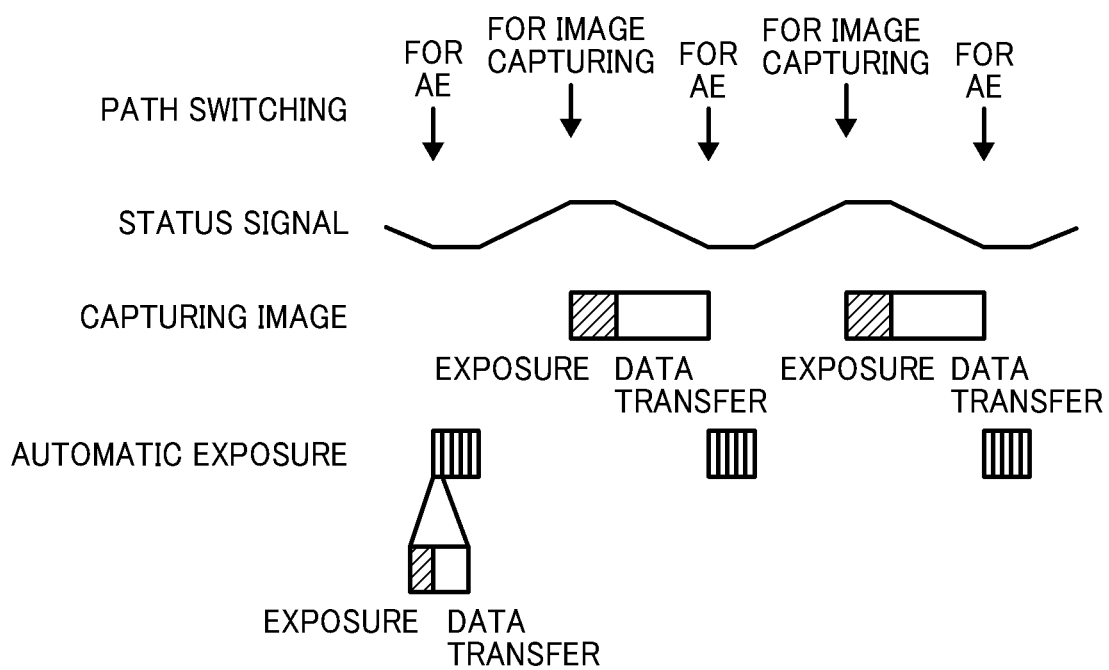
FIG. 6A is a diagram illustrating mirror operation and data transfer.

Operation of switching based on the control register setting value and the status signal 130 from the mirror mechanism 106 is described with reference to FIGS. 6A and 6B. FIG. 6A is a diagram illustrating mirror operation and data transfer operation.

As described in FIG. 6A, in the mirror operation, HIGH indicates a first state (open) in which an image from the lens reaches to the image capturing-image sensor 102A. On the other hand, LOW indicates a second state (close) in which the image from lens reaches to the AE image sensor 102B. In FIG. 6A, shaded portions in image capturing operation and automatic exposer operation indicate light exposure periods. In contrast, blank portions indicate data transfer periods. In the image capturing operation, light exposer and data transfer are individually performed one time. In the automatic exposure operation, a plurality of operations are repeated and each operation includes the light exposure and the data transfer as same as the image capturing operation.

The data transfer in the automatic exposure operation is started when the mirror mechanism 106 detects that the mirror is closed and the data transfer for the image capturing operation is completed. In contrast, the data transfer in the image capturing operation is started when the mirror mechanism 106 detects that the mirror is opened and the data transfer for the automatic exposer operation is completed.

Figure 6B:
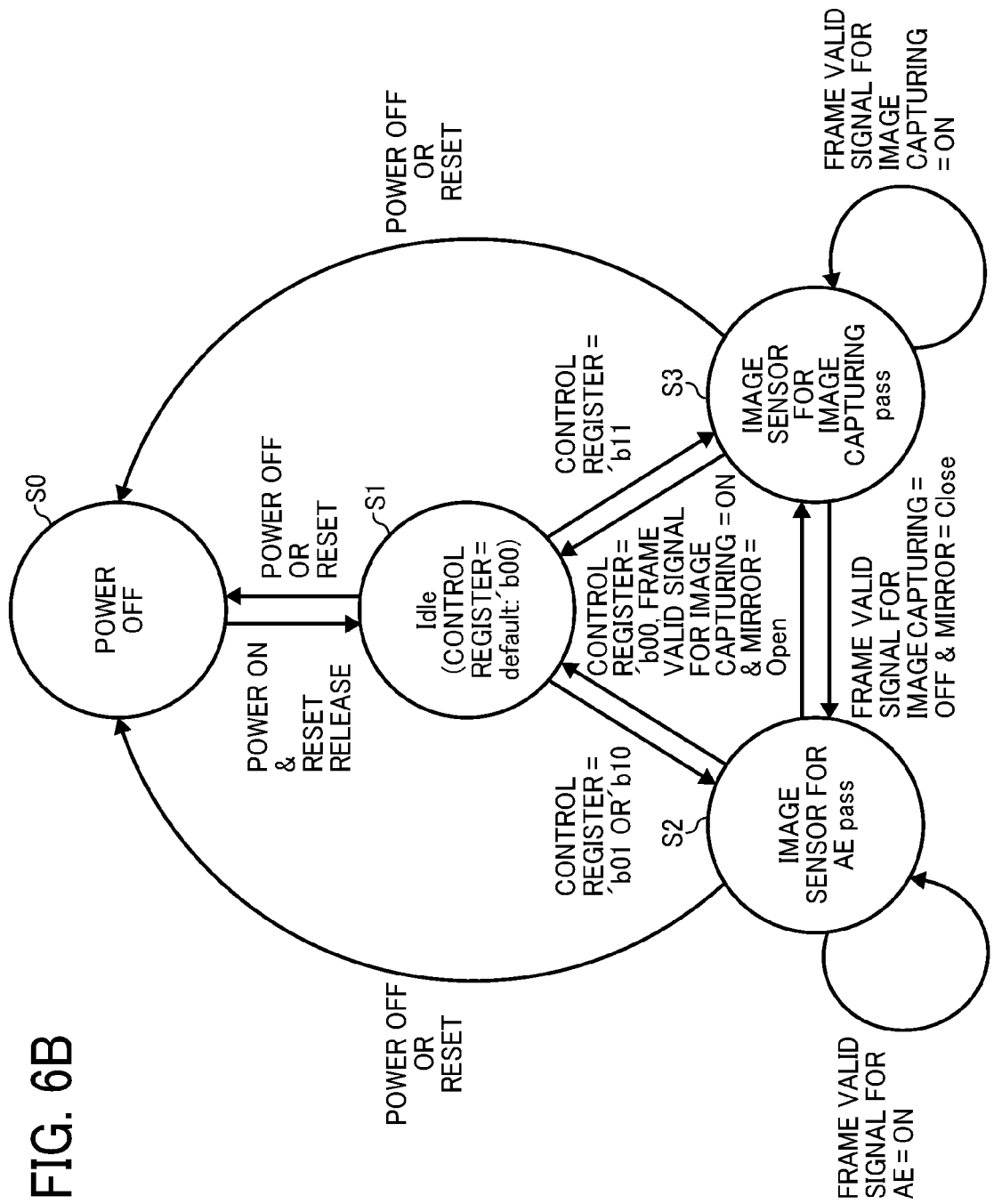
FIG. 6B is a diagram illustrating state transition of the imaging system according to the embodiment.

FIG. 6B is a diagram illustrating state transition of the imaging system 100 according to the embodiment. A state of S0 in FIG. 6B indicates a power OFF state and a reset state. A state of S1 indicates an idle state that is a default state after releasing the reset state. At that time, the control register has a value of 'B00 and is in a state where the transfer is stopped.

A state of S2 indicates a state where the image reaches to the AE image sensor 102B from the lens. In the state of S2, the data in the automatic exposer operation is transferred. A state of S3 is in a state where the image reaches to the image capturing-image sensor 102A from the lens. In the state of S3, the data in the image capturing operation is transferred.

The state transitions from S1 to S2 when the control register is in the state of 'b01 (automatic control) or 'b10 (two-pixel parallel transfer mode (path for image capturing)). In the automatic control, the state transitions to S2 again when the frame valid signal from the AE image sensor 102B side is asserted (frame valid signal for image capturing=ON). The state further transitions to S3 when the frame valid signal from the AE image sensor 102B side is negated (frame valid signal for image capturing=OFF) and the status signal 130 switches to the first state (mirror=open).

The state transitions from S1 to S3 when the control register indicates 'b11 (two-line parallel transfer mode (path for AE)). Under the automatic control, the state transitions to S3 again when the frame valid signal from the image capturing-image sensor 102A side is asserted (frame valid signal for AE=ON). The state further transitions to S2 when the frame valid signal from the image capturing-image sensor 102A side is negated (frame valid signal for AE=OFF) and the status signal 130 switches to the second state (mirror=close).

When the control register is not in the automatic control mode ('b01), the transition between S2 and S3 is not automatically performed.

Figure 7:
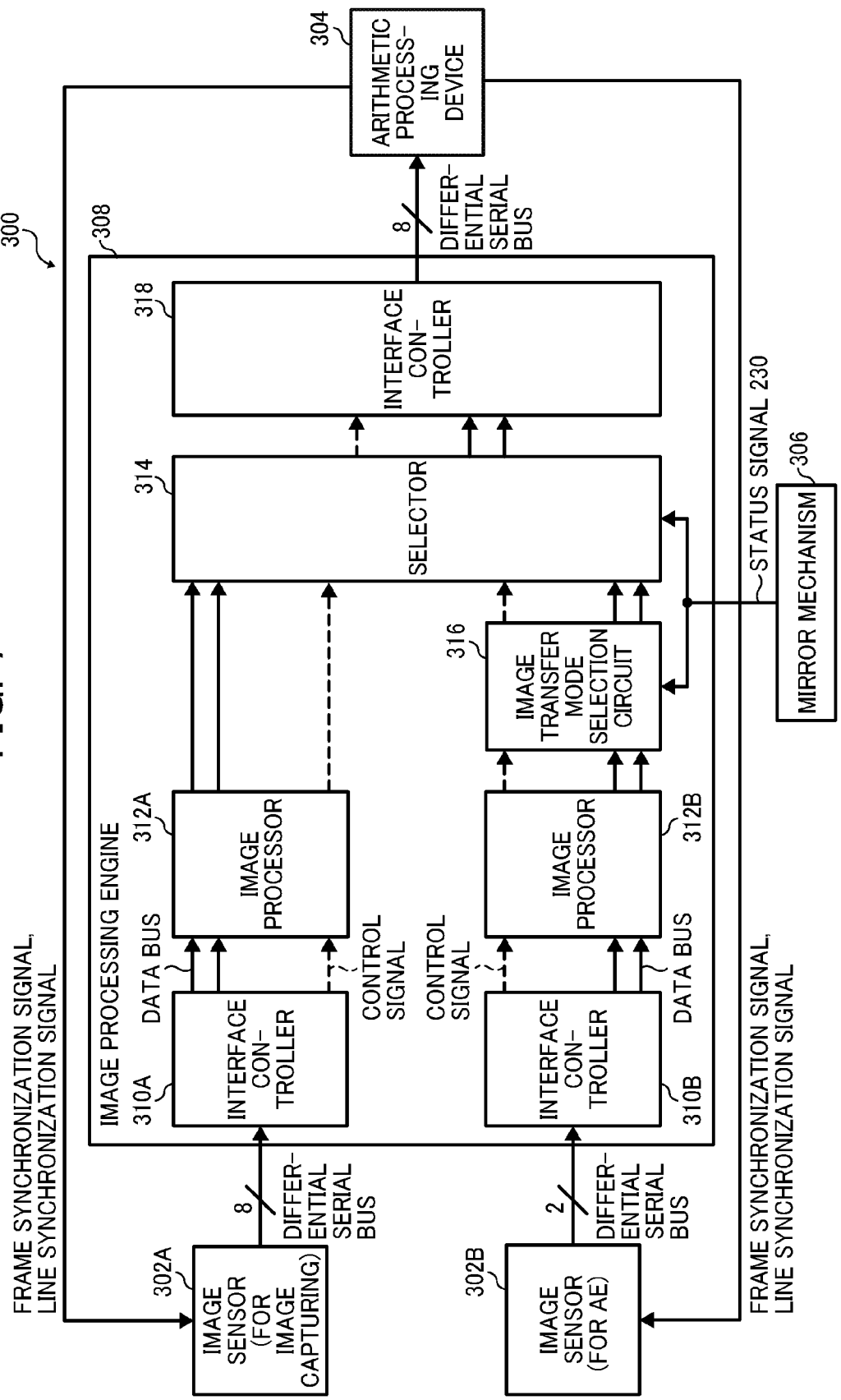
FIG. 7 is a block diagram illustrating an imaging system according to another embodiment.

In the first embodiment described above, the image transfer mode selection circuit 116 is provided in the latter-stage of the selector 114. However, the location of the image transfer mode selection circuit 116 is not limited to the embodiment described above. For example, the image transfer mode selection circuit may be placed in pre-stage of a selector as described below with reference to FIG. 7. FIG. 7 is a block diagram illustrating an imaging system 300 according to a second embodiment. An image processing engine 308 illustrated in FIG. 7 has a similar configuration to the image processing engine 108 according to the first embodiment described above with reference to FIGS. 1 to 6, and differences between the first embodiment and the second embodiment are mainly described below. In FIG. 7, a numeral reference that has the same last two digits with the numeral reference of a corresponding block in FIG. 1 is assigned to a block having the same function as the corresponding block in FIG. 1.

The imaging system 300 illustrated in FIG. 7 includes a plurality of image sensors 302 (302A and 302B), an arithmetic processing device 304, and the image processing engine 308. In FIG. 7, a detailed configuration of the image processing engine 308 is further illustrated. The image processing engine 308 illustrated in FIG. 7 includes a plurality of interface controllers 310 (310A and 310B) placed in an input side, a plurality of image processors 312 (312A and 312B), a selector 314, an image transfer mode selection circuit 316, and an interface controller 318 placed in an output side. In the second embodiment, the two interface controllers 310A and 310B and the two image processors 312A and 312B are provided to correspond to the two image sensors 302A and 302B.

The interface controllers 310A and 310B generate and transfer image data and control signals to the image processors 312A and 312B, respectively. The image processors 312A and 312B process the image data received, for example, encode the image data. The image processor 312A that is used for image capturing directly outputs the image data and the control signal to the selector 314. The image processor 312B that is used for AE outputs the image data and the control signal to the selector 314 via the image transfer mode selection circuit 316.

The image transfer mode selection circuit 316 selects a line-parallel transfer mode from the AE image sensor 302B based on a status signal 330 from the mirror mechanism 306. In the second embodiment, the image transfer mode selection circuit 316 generates a selection control signal that activates a mode changing function when the status signal 330 indicates that a side including the AE image sensor 302B is selected (status signal 330 indicates a second state (close)). The image transfer mode selection circuit 316 then changes a transfer mode of the image data and the control signal, which are from the second side including the AE image sensor 302B, from a pixel-parallel transfer mode to a line-parallel transfer mode, and outputs the image data and the control signal in the changed transfer mode, which is the pixel-parallel transfer mode, to the selector 314 placed in the latter-stage.

The selector 314 selects one of the image data and the control signal transferred from the image capturing-image sensor 302A and the image data and the control signal transferred from the AE image sensor 302B via the image transfer mode selection circuit 316, and then outputs the selected image data and control signal to the interface controller 318 placed in the latter-stage. In the second embodiment, the selector 314 selects a data path that is from the interface controller 310A of an image capturing-image sensor 302A side to the interface controller 318, based on the status signal 330 from the mirror mechanism 306, which indicates the selection of the image capturing-image sensor 302A side. At the same time, the selector 314 selects the data path that is from the interface controller 310B of the AE image sensor 302B side to the interface controller 318, based on the status signal 130 from the mirror mechanism 306, which indicates the selection of the AE image sensor 302B side.

As described above, the image data and the control signal are transferred from the interface controllers 310A and 310B to the interface controller 318. The interface controller 318 generates image area information based on the control signal input from the pre-stage. The interface controller 318 then outputs, in the pixel-parallel transfer mode, the image data from the image capturing-image sensor 302A or the image data of which the transfer mode is changed with the image transfer mode selection circuit 316 to the arithmetic processing device 304 placed in the latter-stage through a differential serial bus.

The image transfer mode selection circuit 316 may be placed in the pre-stage of the selector 314 as described below with reference to FIG. 7.

According to the embodiments as described above, the image processing apparatus, the imaging system, and the data transfer method can process the plurality of lines at a time by transferring the plurality of elements, namely pixels, each of which belongs to corresponding one of the plurality of lines, in parallel, and then output the plurality of elements, namely the pixels, each of which belongs to the same line in parallel by changing the transfer mode according to the signals.

With the configurations of the embodiments, the transfer mode is automatically changed using the status signal 130 from the outside, without involving the arithmetic processing device 104 such as in particular a digital signal processor (DSP), and thus the image data can be obtained with a high speed.

Here, terminologies of element and pixel are interchangeably used each other. In addition to that, the transfer data and the image data are interchangeably used each other. Additionally, as the signals indicating the selections, the status signal indicating a status of the mirror mechanism. The status of mirror mechanism indicates one of the image sensors get an image. However this is not limited to the embodiments, and the transfer mode can be controlled to be changed based on other status signal indicating a state of other part than mirror mechanism in another embodiment. Additionally, the pixels and the image data may be replaced other information elements and other data.

In the embodiments described below, the image processing engines 103 and 308 are described as examples of an image processing device.

However, in other embodiments, the information processing devices may be any devices including still image photographing devices such as a single-lens reflex camera and a digital single-lens camera that includes the image processing engine 108 or 308, moving image capturing devices such as a video camera and a handy camera, image transferring devices such as a facsimile communication device, portable information terminals such as a smart phone and a tablet computer, versatile information processing devices such as a personal computer, etc.

A part of the functions of the described embodiments or all functions of the described embodiments may be implemented by one or more processing circuits. A processing circuit includes a programmed processor, as a processor includes circuitry. A processing circuit includes a programmable device (PD) such as a Field Programmable Gate Array (FPGA) for example. A processing circuit also includes devices such as an application specific integrated circuit (ASIC) and conventional circuit components arranged to perform the recited functions. It is also possible to distribute them storing a recording medium as data described in circuit configuration data (bit stream data) downloaded to the PD to implement the functional blocks on the PD, Hardware Description Language (HDL) for generating the circuit configuration data, Very High speed integrated circuits hardware Description Language (VHDL), and Verilog-HDL etc.

Although the exemplary embodiments of the disclosure have been described and illustrated above, such description is not intended that the disclosure be limited to the illustrated embodiments. Numerous additional modifications and variations are possible in light of the above teachings. It is therefore to be understood that within the scope of the appended claims, the embodiments may be practiced otherwise than as specifically described herein. For example, elements and/or features of different illustrative embodiments may be combined with each other and/or substituted for each other within the scope of this disclosure and appended claims.

What is claimed is:

1. An information processing device comprising:
a first input interface configured to receive data transferred in a first transfer mode in which a plurality of elements of the data each belonging to a same line of a plurality of lines are transferred in parallel;
a second input interface configured to receive data transferred in a second transfer mode in which a plurality of elements of the data each belonging to a corresponding one of the plurality of lines are transferred in parallel;
a mode selection circuit configured to change a transfer mode of the data from the second input interface from the second transfer mode to the first transfer mode based on a signal, the signal indicating selection of the second input interface; and
an output interface configured to output one of the data from the first input interface and the data from the second input interface, the data from the second input interface being output after the transfer mode is changed to the first transfer mode.

2. The information processing device of claim 1, wherein the mode selection circuit comprises:
a setting circuit to set whether to change the transfer mode when the signal indicating the selection of the second input interface is input.

3. The information processing device of claim 1, wherein each of the first input interface and the second input interface is configured to generate a timing control signal based on area information input to each of the first input interface and the second input interface, and the output interface is configured to generate area information based on the timing control signal input to the output interface from a pre-stage, the pre-stage including the first input interface and the second input interface.

4. The information processing device of claim 2, wherein the timing control signal includes a frame valid signal, and when the mode selection circuit detects switching of the signal from the signal indicating the selection of the first input interface to the signal indicating the selection of the second input interface, the mode selection circuit is configured to control data transfer of the data transferred from the second input interface to a latter-stage based on at least one of a state of the frame valid signal from the first input interface and a state of the frame valid signal from the second input interface.

5. The information processing device of claim 2, wherein the timing control signal includes a line synchronization signal, a frame valid signal, and a line valid signal, and the mode selection circuit comprising;
a line buffer;
a buffer configured to store each of the plurality of elements belonging to the corresponding one of the plurality of lines of the data transferred from the second input interface to the line buffer, based on the line synchronization signal, the frame valid signal, and the line valid signal from the second input interface;
a signal generator configured to measure a cycle of the line synchronization signal from the second input interface and generate a pseudo line synchronization signal having a pseudo line cycle based on the cycle measured; and
a controller configured to read the plurality of elements belonging to the same line stored in the line buffer based on the pseudo line synchronization signal and the frame valid signal synchronized with the pseudo line synchronization signal and transfer the data from the second input interface with the line valid signal synchronized with the pseudo line synchronization signal to a latter-stage.

6. The information processing device of claim 5, wherein the first input interface, the second input interface, and the output interface each include a differential serial interface, and
the signal generator is configured to stop generating the pseudo line synchronization signal having the pseudo line cycle during a period in which the frame valid signal indicates a frame is invalid.

7. The information processing device of claim 2, further comprising:
a selector configured to select one of a first data path and a second data path, the first data path being from the first input interface to the output interface, the second data path being from the second input interface to the output interface, wherein
the selector is configured to select the first data path based on the signal indicating the selection of the first input interface, and
the selector is configured to select the second data path based on the signal indicating the selection of the second input interface.

8. The information processing device of claim 6, wherein the timing control signal includes a frame valid signal, and wherein
the selector is configured to control data transfer of the data transferred from the second input interface to a latter-stage based on at least one of a state of the frame valid signal from the first input interface and a state of the frame valid signal from the second input interface, when detecting switching of the signal from the signal indicating the selection the first input interface to the signal indicating the selection of the second input interface.

9. An imaging system comprising:
the information processing device of claim 1;
a first image sensor coupled to the first input interface of the image processing device;
a second image sensor coupled to the second input interface of the image processing device;
an arithmetic processing device coupled to the output interface of the information processing device and configured to output a synchronization signal to each of the first image sensor and the second image sensor; and
a mirror mechanism having a first state where image reaches the first image sensor and a second state where the image reaches the second image sensor; and wherein
the elements include pixels, the data includes image data, and the signal indicating the selection of the second input interface is a status signal indicating that the mirror mechanism is in the second state where the image reaches the second image sensor.

10. The information processing device of claim 1, wherein the first input interface is configured to receive the data from a first image sensor, the second input interface is configured to receive the data from a second image sensor, the elements include pixels, the data includes image data, and the signal indicating the selection of the second input interface is a status signal indicating that an external device is in a state where an image reaches the second image sensor.

11. An information processing device comprising:
first means for inputting data transferred in a first transfer mode in which a plurality of elements of the data each belonging to a same line of a plurality of lines are transferred in parallel;
second means for inputting data transferred in a second transfer mode in which a plurality of elements of the data each belonging to a corresponding one of the plurality of lines are transferred in parallel;
means for changing a transfer mode of the data from the second means for inputting from the second transfer mode to the first transfer mode based on a signal, the signal indicating selection of the second means for inputting; and
means for outputting data from one of the first means for inputting and the second means for inputting, the data from the second means for inputting being output after the transfer mode is changed to the first transfer mode.

12. The information processing device of claim 11, wherein the means for changing comprises:
means for setting whether to change the transfer mode when the signal indicating the selection of the second means for inputting is input.

13. The information processing device of claim 11, wherein
each of the first means for inputting and the second means for inputting generates a timing control signal based on area information, and
the means for outputting generates area information based on the timing control signal input from a pre-stage, the pre-stage including the first means for inputting and the second means for inputting.

14. The information processing device of claim 12, wherein the timing control signal includes a frame valid signal, and when the means for changing detects switching of the signal from the signal indicating the selection of the first means for inputting to the signal indicating the selection of the second means for inputting, the means for changing controls data transfer of the data transferred from the second means for inputting to a latter-stage, based on at least one of a state of the frame valid signal from the first means for inputting and a state of the frame valid signal from the second means for inputting.

15. The information processing device of claim 12, wherein the timing control signal includes a line synchronization signal, a frame valid signal, and a line valid signal, and
the means for changing comprising:
means for storing each of the plurality of elements belonging to the corresponding one of the plurality of lines of the data transferred from the second means for inputting to the line buffer, based on the line synchronization signal, the frame valid signal, and the line valid signal from the second means for inputting;
means for measuring a cycle of the line synchronization signal from the second means for inputting and generating a pseudo line synchronization signal having a pseudo line cycle based on the cycle measured; and
means for reading the plurality of elements belonging to the same line stored in the line buffer based on the pseudo line synchronization signal and the frame valid signal synchronized with the pseudo line synchronization signal and transferring the data from the second means for inputting with the line valid signal synchronized with the pseudo line synchronization signal to a latter-stage.

16. The information processing device of claim 15, wherein
the first means for inputting, the second means for inputting, and the means for outputting includes a differential serial interface, and
means for generating stops generating the pseudo line synchronization signal having the pseudo line cycle during a period in which the frame valid signal indicates a frame is invalid.

17. The information processing device of claim 12 further comprising:
means for selecting one of a first data path and a second data path, the first data path being from the first means for inputting to the means for outputting, and the second data path being from the second means for inputting to the means for outputting, wherein
the means for selecting selects the first data path based on the signal indicating the selection of the first means for inputting, and
the means for selecting selects the second data path based on the signal indicating the selection of the second means for inputting.

18. The information processing device of claim 16, wherein the timing control signal includes a frame valid signal, and wherein
when the means for selecting detects switching of the signal from the signal indicating the selection of the first means for inputting to the signal indicating the selection of the second means for inputting, the means for selecting controls data transfer of the data transferred from the second means for inputting to a latter-stage, based on at least one of a state of the frame valid signal from the first means for inputting and a state of the frame valid signal from the second means for inputting.

19. A method of processing information performed by an information processing device, the information processing device including a first input interface, a second input interface, and an output interface, the method comprising:
inputting, at the first input interface, data transferred in a first transfer mode in which a plurality of elements of the data each belonging to a same line are transferred in parallel; and
outputting, at the output interface, the data transferred in the first transfer mode based on a signal, the signal indicating selection of the second input interface,
inputting data transferred in a second transfer mode in which the plurality of elements each belonging to a corresponding one of a plurality of lines are transferred in parallel;
changing a transfer mode of the data from the second transfer mode to the first transfer mode, in which the plurality of elements each belonging to the same line are transferred in parallel; and
outputting, at the output interface, the data of which the transfer mode is changed from the second transfer mode to the first transfer mode.

20. The method of claim 19, wherein the first input interface is configured to receive the data from a first image sensor, the second input interface is configured to receive the data from a second image sensor, the elements include pixels, the data includes image data, and the signal indicating the selection of the second input interface is a status signal indicating that an external device is in a state where an image reaches the second image sensor.

* * * * *